Aug. 15, 1967  C. S. KNIGHT  3,335,917
CANTEEN WITH DISPOSABLE FILTER CARTRIDGE
Filed June 22, 1965  2 Sheets-Sheet 1

INVENTOR
C. SUTHERLAND KNIGHT

BY Cushman, Darby & Cushman
ATTORNEYS

Aug. 15, 1967 C. S. KNIGHT 3,335,917
CANTEEN WITH DISPOSABLE FILTER CARTRIDGE
Filed June 22, 1965 2 Sheets-Sheet 2
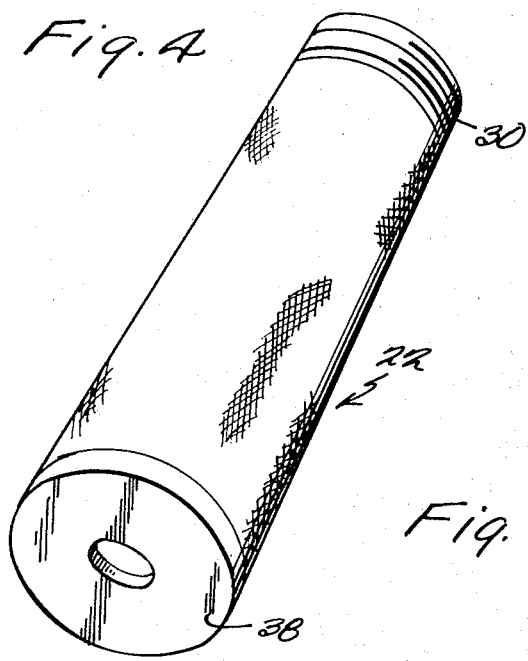
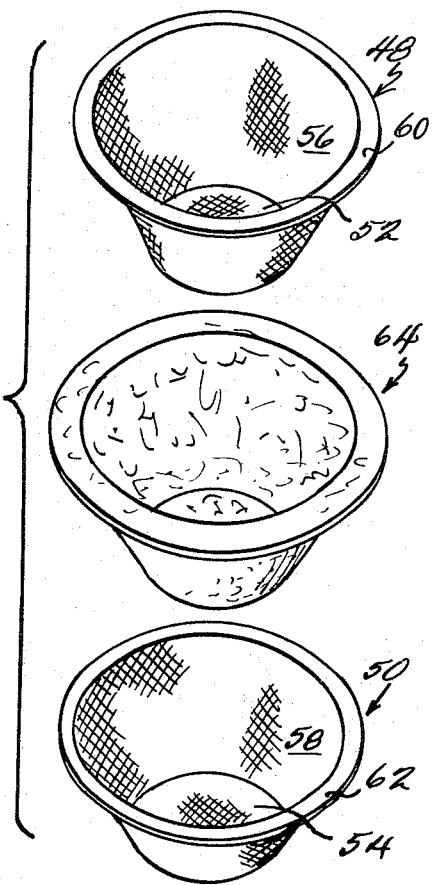
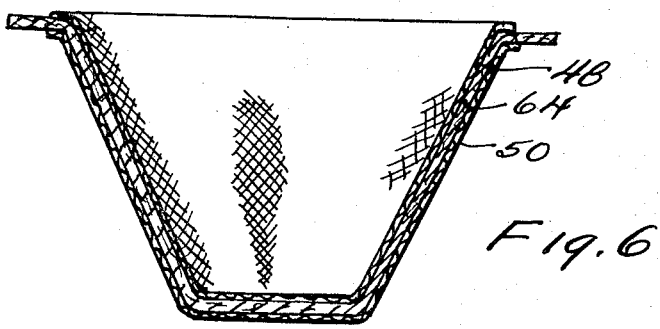
INVENTOR
C. SUTHERLAND KNIGHT
ATTORNEYS United States Patent Office 3,335,917
Patented Aug. 15, 1967

3,335,917
CANTEEN WITH DISPOSABLE FILTER
CARTRIDGE
Charlotte Sutherland Knight, 13 W. 13th St.,
New York, N.Y. 10011
Filed June 22, 1965, Ser. No. 465,899
3 Claims. (Cl. 222—189)

This invention relates to improved portable water purifying apparatus and more particularly to disposable filtering means adapted for use with ordinary portable containers for water such as a canteen, water bag or the like. Heretofore devices adapted for use with portable water containers to filter the water as it was dispensed therefrom suffered from several disadvantages in that they generally were not easily replaceable when their filtering capacity had been reached or they were intricately constructed thus seriously minimizing their general acceptance by the public due to the prohibitive cost of their production.

It has long been recognized that there exists a real need for a simple, relatively inexpensive means to filter water prior to its consumption by man whether the water source be from an ordinary tap, or a natural source such as a spring, well or the like. For instance, during military engagements canteens or other similar receptacles are often filled with water from an available source regardless of its quality. The results of drinking the water unless, prior to its introduction into these containers, it is filtered, are too well known to require elaboration. A similar problem is experienced with sportsmen and campers in providing for themselves suitable drinking and cooking water from streams and lakes.

It is, therefore, a principal object of the instant invention to provide an improved portable water purifying apparatus whereby water is conveniently filtered through a disposable filter while it is being dispensed therefrom.

Another object of the instant invention is to provide an improved canteen and a disposable filter therefor which is the embodiment of simplicity and serviceability.

Yet another object of the instant invention is to provide a simple economical disposable filter unit for use with water purifying apparatus.

A further object of the instant invention is to provide a water purifying apparatus having means for removably retaining the purifying material in position in the device, said retaining means and purifying material being easily and economically replaceable when the purifying capacity of the material has been reached.

These and other objects of the invention will become apparent from a study of this specification, the accompanying drawings and the appended claims in which the various novel features of the invention are more particularly set forth.

FIGURE 4 is a perspective view of the filter means showing FIGURE 1;

FIGURE 5 is an exploded perspective view of yet another embodiment of a filter means made according to the instant invention; and FIGURE 6 is a vertical sectional view of the assembled filter means shown in FIGURE 5.

Figure 1:
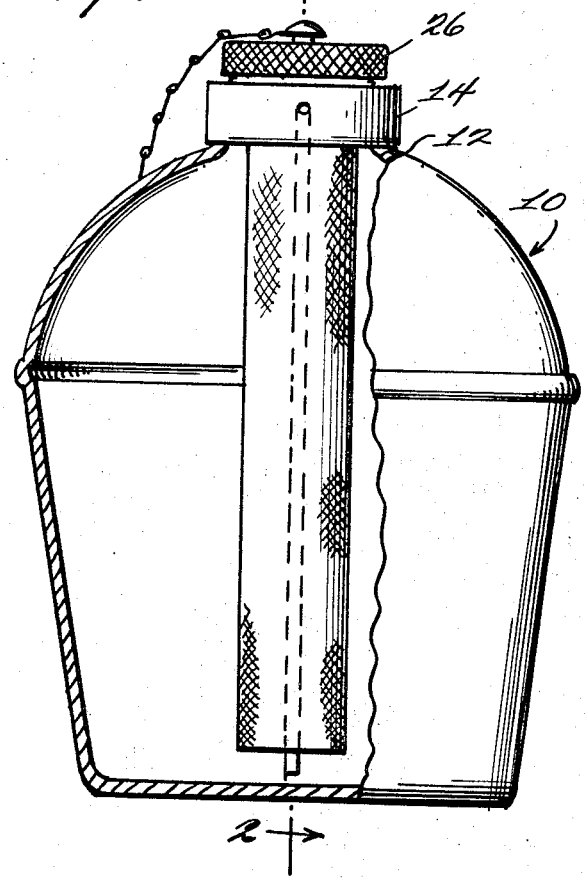
FIGURE 1 is an elevational view of a canteen with parts removed to illustrate the filter means of the present invention.
Figure 2:
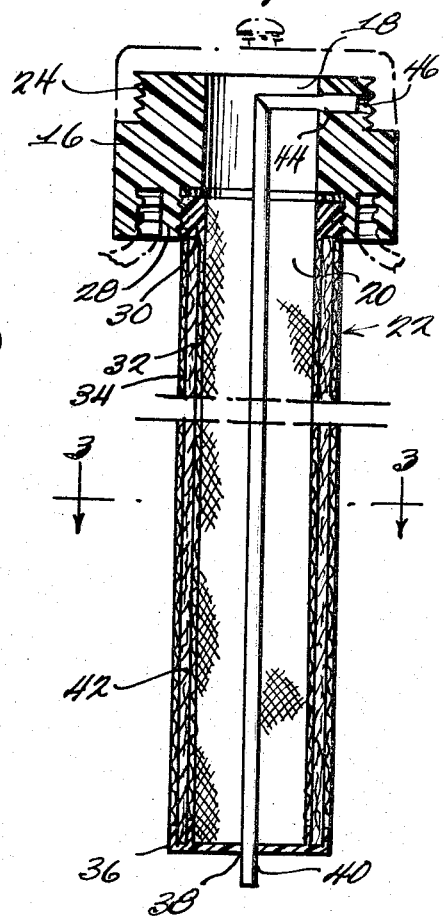
FIGURE 2 is a sectional view taken substantially on the line 2—2 of FIGURE 1.
Figure 3:
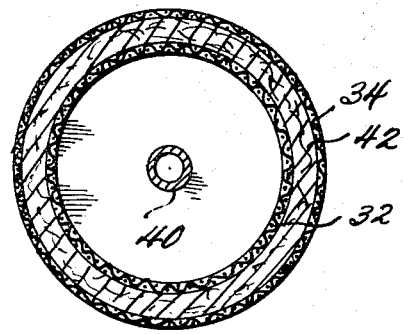
FIGURE 3 is a sectional view taken substantially on the line 3—3 of FIGURE 2.

Referring to the drawings, the numeral 10 designates a canteen which can be of conventional shape and which can have a capacity of approximately one quart. The canteen is provided with an opening 12 and an externally threaded flange 14 employed to releasably secure dispensing assembly 16. The dispensing assembly 16 is provided with a centrally disposed aperture 18 through which the filtered contents of the canteen 10 are discharged. Aperture 18 is in axial alignment with the centrally disposed aperture 20 of the disposable filter means 22 of the instant invention. An externally threaded flange 24 is provided on the upper end of the dispensing assembly 16 to releasably secure a cover 26 to normally protect the contents of the canteen 10 from the atmosphere when not in use. An internally threaded flange 28 is provided on the lower end of the dispensing assembly 16 to releasably engage externally threaded ring 30 from the lower surface of which there is integrally united the filter means 22 of this invention.

Thus, in addition to the attaching means 30, the disposable filter means 22 of the instant invention comprises an inner perforated support means 32 and a spacedly removed outer perforated support means 34 extending downwardly into the canteen and being substantially circular in cross section. Adjacent the lower end of the filter means 22 the inner and outer perforated support means 32 and 34 are sealingly joined together by seal 36 provided with a centrally disposed aperture 38 through which extends a tube 40 generally coaxially with aperture 20 of the disposable filter means 22. Retainingly secured between inner and outer support members 32 and 34 is the purifying or filtering material 42.

Preferably, the filtering material is asbestos although it will be recognized that any other convenient filtering medium can be employd. Representative examples of other purifying or filtering material that can be used include charcoal and zeolites or other inorganic or organic filtering materials.

The tube 40 extends upwardly and coaxially through the aperture 20 and the aperture 18 of the dispensing assembly 16 where it is bent and press fitted into radially extending aperture 44 in the dispensing assembly 16. Tube 40 provides an air vent to the interior of the canteen, air being admitted thereto through opening 46 in the threaded flange 24 of the dispensing assembly 16. When not in use this opening is closed by the cap 26.

It will be observed that on tipping the canteen the water contained therein flows through the disposable filter means 22 and out the centrally disposed aperture 20 thereof which is in communication with the outlet 18.

The filter means 22 as described hereinabove comprises an inner perforated support means 32, an outer perforated support means 34 with the filtering material 42 retainingly secured therebetween. Preferably, the inner and outer support means are fabricated from a wide mesh plastic screen or cloth. Advantageously the plastic screen or cloth can be made from a thermoplastic material such as polyethylene or polypropylene although it will be recognized that any other thermoplastic material can be employed. Alternatively, the wide mesh screen or cloth can be produced from a thermosetting resinous material. The mesh size will depend on the filter material chosen. For instance, when the filter material utilized is granular in form the mesh size must at least be smaller than the size of the granules employed. When the filter medium is a layer of asbestos material the mesh size often is relatively large. But whatever the filter material chosen the mesh size should be sufficiently large to avoid unnecessarily high pressure drops through the wall of the filter, thus assuring relatively smooth flow and filter of the water contained in the canteen.

An asbestos filter material employed in the production of a filter means 22 has been found to effectively remove substantially all suspended particles including bacteria in untreated water. The filter means has been found to efficiently purify water regardless of its quality for periods as long as 30 days of continuous use and longer.

Another embodiment of the instant invention is shown in FIGURES 5 and 6. The inner and outer support members 48 and 50, respectively, have a substantially flat bottom 52 and 54 also respectively, to which is integrally attached an upwardly and outwardly flaring conical side wall 56 and 58 also respectively. The upper peripheral surface of each of said side walls terminates in a horizontally disposed flange member 60 and 62, also respectively. The filter material 64 conforms to the outer and inner surfaces respectively of inner and outer support members 48 and 50 and can be retainingly secured therebetween in any convenient manner as by the use of an adhesive around the horizontal flange members 60 and 62. Alternatively, the said flange members can be heat sealed to retainingly secure said filter material in place.

While the particular embodiments of the present invention have been shown and described, it will be obvious to those skilled in the art that changes and modifications may be made without departing from this invention in its broader aspects and, therefore, the invention is to be considered as embodying all such changes and modifications as are included within the scope of the following claims.

What is claimed is:
1. A water purifying apparatus comprising:
   (1) a canteen having an externally threaded necked outlet
   (2) a dispensing assembly member provided with:
       (a) a central axial bore therethrough,
       (b) an externally threaded necked outlet at the upper end thereof in communication with the outlet of said canteen through said bore, said necked outlet having a radially extending bore in communication with the axial bore thereof,
       (c) an outwardly, downwardly extending internally threaded flange to removably engage the externally threaded necked outlet of said canteen, and
       (d) an inwardly, downwardly internally threaded flange coaxially extending within said necked outlet of said canteen to removably engage
   (3) a disposable filter element having an upper end being externally threaded and comprising a double walled tubular assembly consisting of:
       (a) an inner open mesh plastic wall spacedly secured to
       (b) an outer open mesh plastic wall at their upper ends by a disk member having a central bore the dimension of which is substantially equal to the dimension of the central axial bore of the dispensing assembly member and at their lower ends by a disk member, and
       (c) filtering material retainingly secured between said inner and outer walls, said lower end disk member having a central bore to sealingly engage the peripheral wall of
   (4) a hollow tube member extending coaxially with and inside said disposable filtering element, the lower end of said hollow tube extending beyond said disk member fixedly attached to the lower end of said inner and outer open mesh walls to adjacent the bottom of said canteen and the upper end of said hollow tube being in communication with the atmosphere through said radial bore in the necked outlet of said dispensing assembly member, and
   (5) an internally threaded cap adapted to removably engage said necked outlet of said dispensing assembly member so as to cover said radial bore when so engaged.

2. The water purifying apparatus of claim 1 wherein the filtering material is asbestos.

3. A disposable water filtering means for a portable container comprising a disposable filtering element comprising an externally threaded ring member, an inner elongated open mesh plastic wall attached at one end to the planar surface of said ring, the diameter of said inner plastic wall being substantially equal to the diameter of the ring aperture, an outer elongated open mesh plastic wall attached at one end to said planar surface of said ring, the diameter of said outer plastic wall being substantially equal to the diameter of the ring, the other end of both said inner and outer plastic walls being sealingly attached to a disk member having a central bore therethrough, said central bore being axially aligned with said ring aperture, and a layer of asbestos filtering material retainingly secured between said inner and outer walls.

References Cited

UNITED STATES PATENTS

| | | | |
|---|---|---|---|
| 2,149,227 | 2/1939 | Olson et al. | 222—189 X |
| 2,185,512 | 1/1940 | McHale | 210—497 |
| 2,554,748 | 5/1951 | Lewis et al. | 210—484 |
| 2,738,105 | 3/1956 | Wolfer et al. | 222—189 |
| 2,911,101 | 11/1959 | Robinson | 210—489 X |
| 3,083,834 | 4/1963 | Pall | 210—489 X |

ROBERT B. REEVES, *Primary Examiner.*

STANLEY H. TOLLBERG, *Examiner.*